United States Patent
Hartwich

(10) Patent No.: US 11,196,510 B2
(45) Date of Patent: Dec. 7, 2021

(54) USER STATION FOR A SERIAL COMMUNICATION NETWORK AND METHOD FOR CORRECTING INDIVIDUAL ERRORS IN A MESSAGE OF A SERIAL COMMUNICATION NETWORK

(71) Applicant: Robert Bosch GmbH, Stuttgart (DE)

(72) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/966,730

(22) PCT Filed: Dec. 18, 2018

(86) PCT No.: PCT/EP2018/085645
§ 371 (c)(1),
(2) Date: Jul. 31, 2020

(87) PCT Pub. No.: WO2019/121779
PCT Pub. Date: Jun. 27, 2019

(65) Prior Publication Data
US 2021/0250123 A1    Aug. 12, 2021

(30) Foreign Application Priority Data
Dec. 22, 2017 (DE) .......................... 102017223776.7

(51) Int. Cl.
*H04L 1/00* (2006.01)
*H04L 12/40* (2006.01)

(52) U.S. Cl.
CPC .......... *H04L 1/0061* (2013.01); *H04L 1/0013* (2013.01); *H04L 1/0071* (2013.01);
(Continued)

(58) Field of Classification Search
CPC ... H04L 1/0061; H04L 1/0013; H04L 1/0071; H04L 12/40; H04L 2001/0094; H04L 2012/40215
See application file for complete search history.

(56) References Cited

U.S. PATENT DOCUMENTS

2001/0034223 A1* 10/2001 Rieser .................... H04L 29/06
455/404.2
2002/0166091 A1   11/2002 Kidorf et al.
(Continued)

FOREIGN PATENT DOCUMENTS

| EP | 2343812 A1 | 7/2011 |
| EP | 3054627 A1 | 8/2016 |

OTHER PUBLICATIONS

International Search Report dated Feb. 19, 2019 in connection with PCT/EP2018/085645.

*Primary Examiner* — Kyle Vallecillo
(74) *Attorney, Agent, or Firm* — Norton Rose Fulbright US LLP; Gerard Messina

(57) ABSTRACT

A user station for a serial communication network and a method for correcting individual errors in a message of a serial communication network are provided. The user station includes a communication control unit for creating a message, which is to be transmitted serially to at least one further user station of the communication network. The communication control unit is designed to subdivide the data of the message to be created into at least one data portion and to insert into each data portion bits of an error correction code, which ensures a correction of at least one error in the message.

11 Claims, 3 Drawing Sheets

(52) U.S. Cl.
CPC ...... *H04L 12/40* (2013.01); *H04L 2001/0094* (2013.01); *H04L 2012/40215* (2013.01)

(56) References Cited

U.S. PATENT DOCUMENTS

| | | | | |
|---|---|---|---|---|
| 2007/0076708 | A1* | 4/2007 | Kolakowski | H04L 1/0071 |
| | | | | 370/389 |
| 2008/0109707 | A1* | 5/2008 | Dell | H03M 13/03 |
| | | | | 714/776 |
| 2010/0275031 | A1* | 10/2010 | Ferry | H04L 63/029 |
| | | | | 713/181 |
| 2017/0353267 | A1* | 12/2017 | Kudekar | H04L 1/0061 |
| 2017/0353271 | A1* | 12/2017 | Kudekar | H04L 1/0054 |
| 2018/0097583 | A1* | 4/2018 | Nammi | H04L 1/0072 |
| 2019/0074556 | A1* | 3/2019 | Onoda | H01M 10/4207 |
| 2019/0385057 | A1* | 12/2019 | Litichever | G06N 3/08 |

* cited by examiner

USER STATION FOR A SERIAL COMMUNICATION NETWORK AND METHOD FOR CORRECTING INDIVIDUAL ERRORS IN A MESSAGE OF A SERIAL COMMUNICATION NETWORK

FIELD

The present invention relates to a user station for a serial communication network and to a method for correcting individual errors in a message of a serial communication network.

BACKGROUND INFORMATION

A communication protocol is used for transmitting data between two user stations of a communication network. The protocol establishes the pattern according to which the data are bundled in packets or in messages to be transmitted. In a serial communication network, different messages and, therefore, also the data, which are coded in successive bits in the messages, are transmitted in succession via a communication line of the communication network.

To safeguard the correct communication in the communication network, some serial communication protocols include an error identifier such as, for example, a parity bit, a check sum or a CRC (=cyclic redundancy check). With the error identifier, it is possible for the receivers of a message to provide the transmitter feedback as to whether or not the receivers have identified an error in the received message.

For example, the communication networks CAN, LIN, FlexRay, or Ethernet transmit the message together with a check sum (CRC) in order to be able to identify a bit error in the message. For example, the CRC polynomial of the CAN protocol has a hamming distance of 6, thus, it is possible to identify up to 5 bit errors.

In conventional two-wire busses in vehicles, a bit error probability of $10^{-6}$ is generally assumed, the error probability increasing with the increasing length of the message or frame. For example, 4 Kbyte-long frames contain with a probability of approximately 3.3% at least one error. As a result, each $30^{th}$ frame would then be invalid.

A message in the communication network, if it has been distorted by (identified) bit errors, is not accepted by the receivers and must be transmitted once again. This increases the transmission load of the communication network and potentially delays the communication in the communication network as a result of double the transmission of messages.

In order to keep the error rate low in serial communication networks, the communication protocols specify additional frame bits for a serial, non-modulated transmission, which produce particular synchronization edges in order to synchronize the receivers with the transmitter. In the case of LIN, which is specified in ISO 17987, two additional bits per byte are inserted for this purpose, a start bit before and a stop bit inverse thereto after the byte. In the case of FlexRay, which is specified in ISO 17458, a two bit-long byte-start sequence is inserted before each byte for the described synchronization. In the case of CAN, which is specified in ISO 11898, stuff bits are provided, which are inserted into the data stream after five identical bits as a bit inverse thereto. Thus, in the case of LIN and FlexRay, 20% of the transmitted bits contain no payload data, CAN is only slightly better, even though a stuff bit having an inverse level is inserted, if necessary, only after 10 identical bits instead of 5 identical bits.

Even this described measure for lowering the error rate of the transmission increases the transmission load of the communication network and delays the communication in the communication network due to the transmission of 20% non-payload data.

SUMMARY

It is an object of the present invention to provide a user station for a serial communication network and a method for correcting individual errors in a message of a serial communication network, which solve the aforementioned problems. In accordance with the present invention, a user station for a serial communication network and a method for correcting individual errors in a message of a serial communication network, in particular, are to be provided, in which a transmission of messages with a lower error rate and a bit rate higher than previously are possible.

The object is achieved by a user station for a serial communication network having the features of an example embodiment of the present invention. In an example embodiment, the user station includes a communication control unit for creating a message, which is to be transmitted serially to at least one further user station of the communication network, the communication control unit being designed to subdivide the data of the message to be created into at least one data portion and to insert bits of an error correction code into each data portion, which enable the correction of at least one error in the message.

With the user station, an error correction coding is provided, which is simultaneously able to provide a sufficient number of synchronization edges, with the aid of which receivers of a serially transmitted message are able to synchronize with the transmitter of the message. With individual errors, a repetition of the transmission is advantageously unnecessary. In one advantageous embodiment of the user station, the previously required synchronization bits that do not transport information may also be saved.

As a result, the error rate of the message transmission in the communication network, and thus the frequency of multiple transmissions of messages, is markedly reduced. This enables higher bit rates with a simultaneously reliable data transmission in the serial communication network.

Advantageous further embodiments of the user station in accordance with the present invention are described herein.

In one exemplary embodiment of the present invention, the error correction code is designed in such a way that the correction of an individual error is possible in each data portion and a double error in the associated data portion may be identified.

It is possible that the at least one error in the message is an individual error or double error.

The communication control unit is possibly designed to add a check sum at the end of the message, which is applied to potentially corrected data bits.

According to one further exemplary embodiment of the present invention, the communication control unit is designed to insert the bits of the error correction code as a synchronization edge in such a way that the spacing of the synchronization edges, which are provided for a synchronization of the at least one further user station as receiver of the message with the user station as transmitter of the message, does not exceed a predetermined upper limit.

It is possible for the at least one synchronization edge to be provided for a hard synchronization or a resynchronization.

It is possible that the bits of the error correction code are individual bits or double bits or that the error correction code includes a combination of individual bits and double bits.

In one specific variant of the present invention, the user station may be designed for a communication network, in which an exclusive, collision-free access of a user station to a bus line of the communication network is at least temporarily ensured.

The message is, in particular, a CAN message or a CAN FD message.

The above-described user station may be part of a communication network, which also includes a parallel bus line and at least two user stations, which are interconnected via the bus line in such a way that they are able to communicate with one another.

In this case, at least one of the at least two user stations is an above-described user station.

The aforementioned object may also be achieved by a method for correcting individual errors in a message of a serial communication network in accordance with an example embodiment of the present invention. In an example embodiment of the present invention, the method has the step: creating, using a communication control unit, a message which is to be transmitted serially to at least one further user station of the communication network, the communication control unit subdividing the data of the message to be created into at least one data portion and inserting into each data portion bits of an error correction code, which enable a correction of at least one error in the message.

The method provides the same advantages as mentioned above with respect to the user station.

Further possible implementations of the present invention also include combinations not explicitly mentioned of features and specific embodiments described above or below with respect to the exemplary embodiments. In this case, those skilled in the art will also add individual aspects as improvements on or additions to the respective basic form of the present invention

BRIEF DESCRIPTION OF THE DRAWINGS

The present invention is described in greater detail below with reference to the figures and based on exemplary embodiments.

In the figures, identical or functionally identical elements are provided with the same reference numeral unless otherwise indicated.

DETAILED DESCRIPTION OF EXAMPLE EMBODIMENTS

Figure 1:
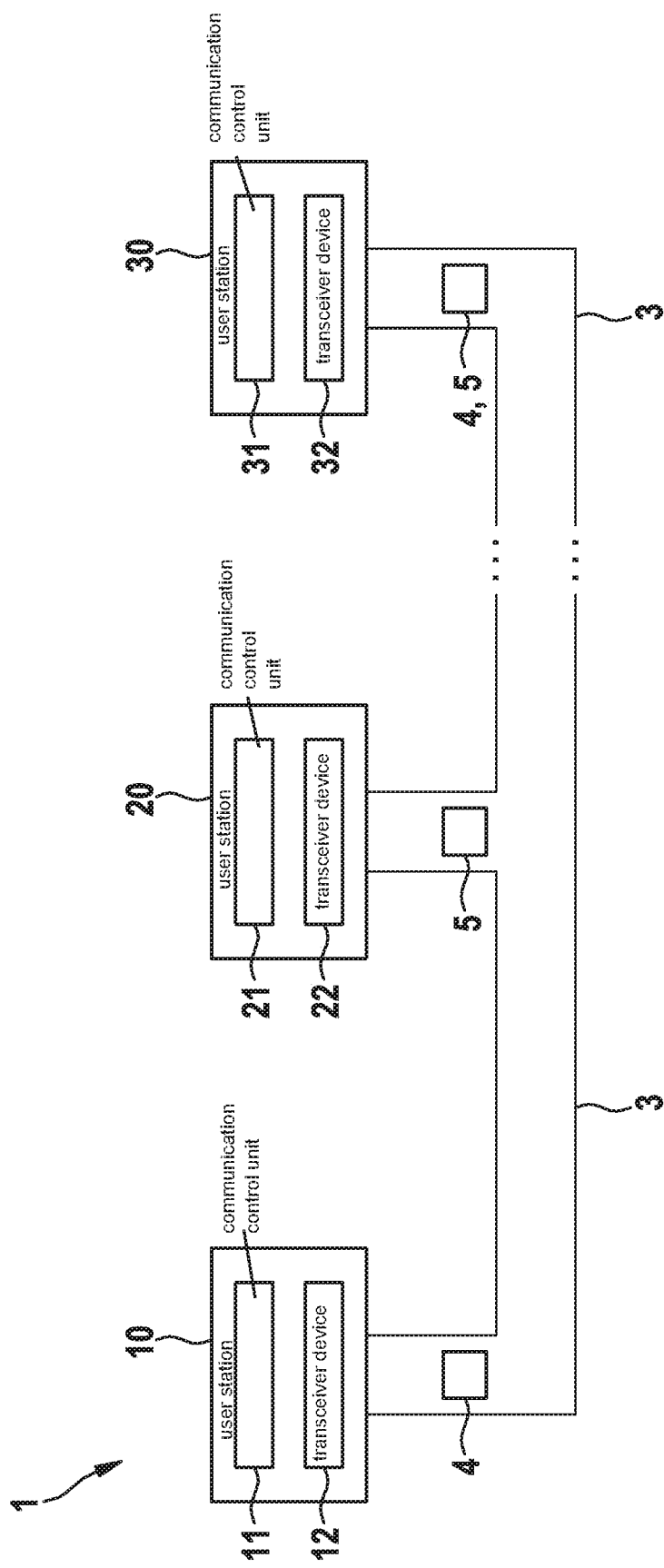
FIG. 1 shows a simplified block diagram of a communication network according to one first exemplary embodiment of the present invention.

FIG. 1 shows, by way of example, a serial communication network 1, which may be designed as an arbitrary serial communication network. Communication network 1 is, in particular, a CAN bus system, a CAN FD bus system, a LIN bus system, a FlexRay bus system, a bus system for Ethernet, a Gigabit-Ethernet, etc. Communication network 1 is usable in a vehicle, in particular, in a motor vehicle, in an aircraft, etc., or in a hospital, etc.

Communication network 1 in FIG. 1 has a, in particular parallel, bus line 3, to which a plurality of user stations 10, 20, 30 are connected. Messages 4, 5 in the form of signals are transmittable serially over bus line 3 between individual user stations 10, 20, 30. User stations 10, 20, 30 are arbitrary devices intended to exchange data serially with one another such as, for example, control units, sensors, display devices, etc., of a motor vehicle. Alternatively, user stations 10, 20, 30 are, for example, computers of a computer network or components of an automation network for an industrial facility. User stations 10, 20, 30 are, however, not limited to the aforementioned specific examples.

The present invention is described below by way of example based on the CAN bus system and CAN FD bus system. However, the present invention is not limited thereto; rather, the present invention may be applied to an arbitrary serial bus system.

As shown in FIG. 1, user station 10 has a communication control unit 11 and a transceiver device 12. In contrast, user station 20 has a communication control unit 21 and a transceiver device 22. User station 30 has a communication control unit 31 and a transceiver device 32. Transceiver devices 12, 22, 32 of user stations 10, 20, 30 are each directly connected to bus line 3, even though this is not illustrated in FIG. 1.

Communication control unit 11, 21, 31 each serve to control a communication of respective user station 10, 20, 30 over bus line 3 with a different user station of user stations 10, 20, 30, which are connected to bus line 3.

Communication control unit 11, for the example of the CAN bus system, may be designed as a conventional CAN controller except for the differences described in still greater detail below. In this case, communication control unit 11 creates and reads first messages 4, for example, modified classic CAN messages 4. Classic CAN messages 4 are structured according to the classic basic format except for the modifications described below, in which a number of up to 8 data bytes may be included in message 4 as shown in the upper part of FIG. 2.

Communication control unit 21 in FIG. 1, for the example of the CAN bus system, may be designed as a conventional CAN FD controller except for the differences described in still greater detail below. In this case, communication control unit 21 creates and reads second messages 5, which are modified CAN FD messages 5, for example. In this case, the modified CAN FD messages 5 are structured on the basis of a CAN FD format except for the modifications described below, in which a number of up to, for example, 64 data byes may be included in message 5, as shown in the lower part of FIG. 2.

Communication control unit 31, for the example of the CAN bus system, may be designed in order, as needed, to provide for or to receive from transceiver device 32 a modified classic CAN message 4 or a modified CAN FD message 5. Thus, communication control unit 21 creates and reads a first message 4 or second message 5, first and second message 4, 5 differing in terms of their data transmission standard, namely, in this case, modified CAN or modified CAN FD.

Transceiver device 12 may thus be designed as a conventional CAN transceiver. Transceiver device 22 may be designed as a conventional CAN FD transceiver. Transceiver device 32 may be designed in order, as needed, to provide for or to receive from communication control unit 31 messages 4 according to the modified CAN base format or messages 5 according to the modified CAN FD format.

A formation and then transmission of messages 5 with the modified CAN FD or also at data rates higher than CAN FD are implementable with the two user stations 20, 30.

Figure 2:
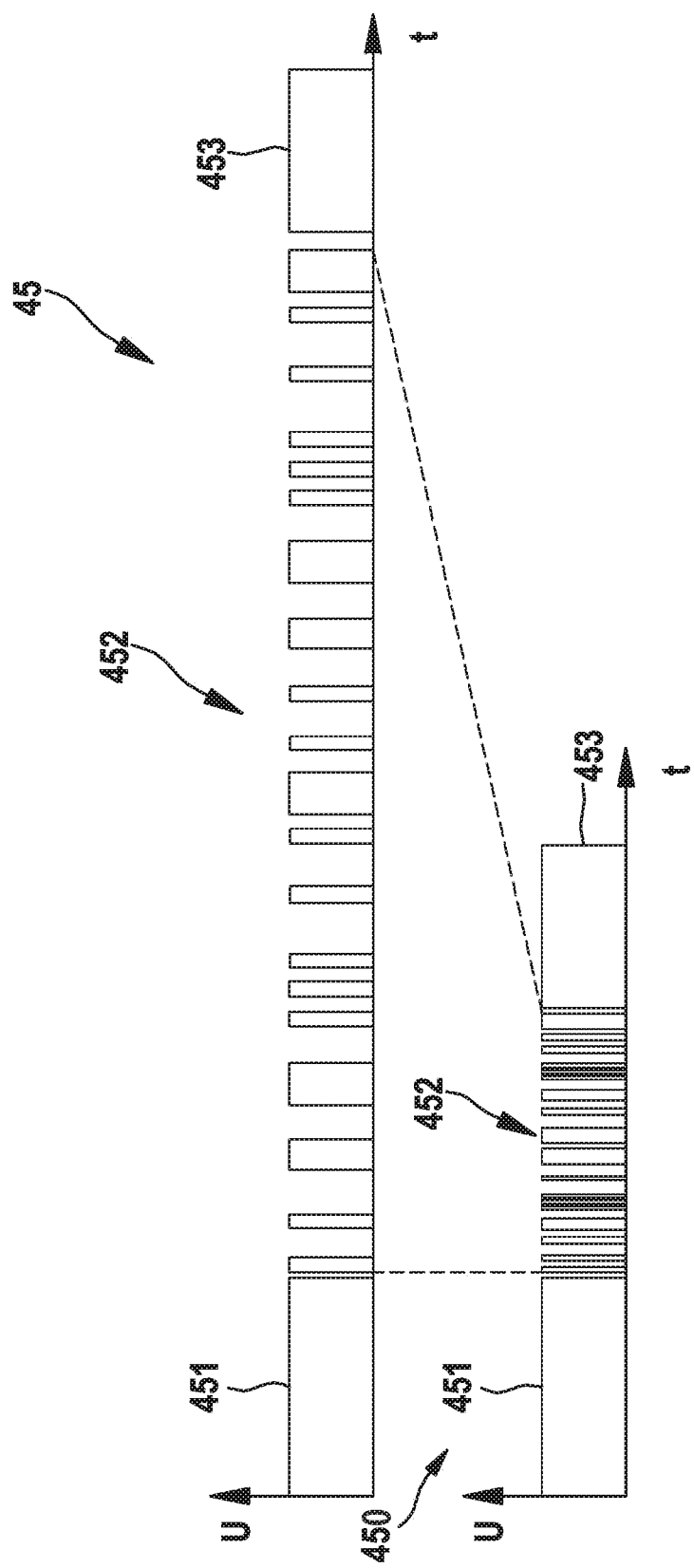
FIG. 2 shows a diagram for illustrating the structure of messages which are able to be transmitted by user stations of the communication network according to one first exemplary embodiment of the present invention.

The upper part of FIG. 2 shows for message 4 a CAN frame 45 as it is transmitted by transceiver device 12 or by transceiver device 13, and in its lower part for message 5 a CAN FD frame 450 as it may be transmitted by transceiver device 22 or 32. CAN frame 45 and CAN FD frame 450 are subdivided basically into two different phases or areas for the CAN communication on bus 40, namely, arbitration phases 451, 453 and a data area 452, which is also referred to as a data field in classic CAN or also as data phase 452 in CAN FD. The payload data of the CAN FD frame or of message 5 are contained in data phase 452.

According to FIG. 2, the bit rate for following data phase 452 is increased, for example, to 2, 4, 8 Mbps at the end of arbitration phase 451 in CAN FD as compared to the classic CAN. This means that in CAN FD, the bit rate in arbitration phases 451, 453 is lower than the bit rate in data phase 452. In CAN FD, data phase 452 of CAN FD frame 450 is temporally significantly reduced compared to data phase 452 of CAN frame 45.

In a serial communication network 1 or bus system without arbitration 451, 453 such as, for example, Ethernet, FlexRay, etc., two data phases 452 follow in direct succession.

Figure 3:
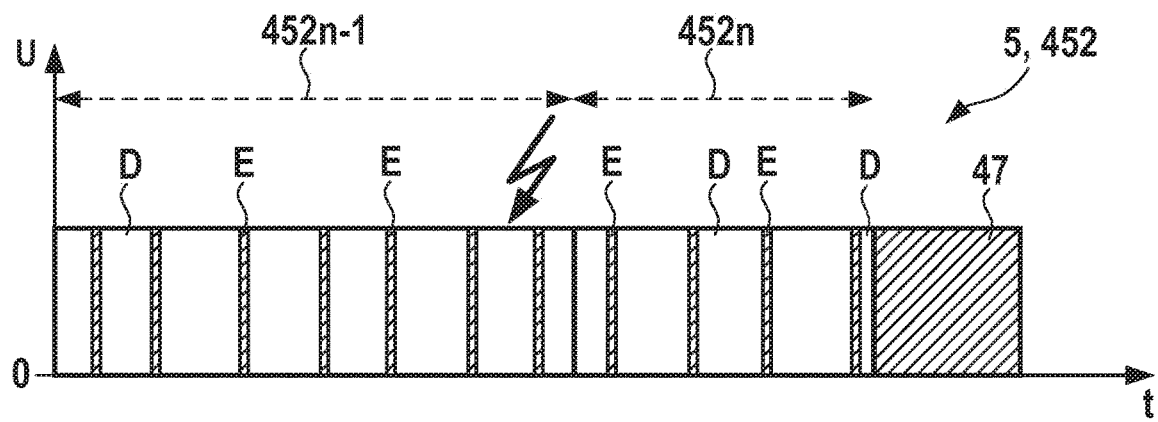
FIG. 3 schematically shows a representation of one part of a message for a specific example of an insertion of error correction bits in a data phase of a message in a user station of a communication network according to the first exemplary embodiment of the present invention.

FIG. 3 illustrates in a greatly simplified manner a data portion of a data phase 452 for a message 5 as an example, which is transmittable serially via a two-wire bus line as bus line 3. Alternatively, a message 4 is usable or a message that is structured according to a different serial communication protocol.

Data phase 452 is subdivided into a plurality of data portions 4521 through 452*n*, n being a natural number. If, for example, 4096 data bytes are present, n could be selected, in particular, as 512, so that data portions 4521 through 452*n* respectively are present with 8 data bytes. Arbitrary other values for n are however also selectable. Data portions 4521 through 452*n* may, in particular, have more or fewer than 8 data bytes.

For the sake of simplicity only two data portions of the data portions 4521 through 452*n* are shown in FIG. 3, namely, the two data portions 452*n*−1 and 452*n* at the end of data phase 452.

Bits E of an error correction code, also referred to below as error correction bits E, are inserted into each of data portions 452*n*−1 and 452*n*. To simplify, individual bits D of message 5 are not depicted in FIG. 3 and bits D, E are not all provided with a reference numeral.

In data portion 452*n*−1, an error has occurred by way of example, which is illustrated in the form of a black jagged block arrow. The error may be an individual error or a double error or an arbitrary other error. A check sum 47 or a CRC (=cyclic redundancy check) is optionally provided at the end of message 5.

In the example of FIG. 3, data portions 4521 through 454*n*−1 each have eight bytes including 8 data bits D and 8 error correction bits E of an error correction code distributed therein.

Thus, in this specific example of a 64 bit-long data portion of data portions 4521 through 452*n*, an 8 bit-long error correction code (ECC) is to be ascertained, whose error correction bits E are inserted in a distributed manner into each data portion 4521 through 452*n*. The combination of 64 data bits D and 8 error correction bits E may be easily implemented in hardware, for which there are numerous examples. Any other combination is alternatively possible and implementable, however.

In the specific example of FIG. 3, the 8 error correction bits E are unevenly distributed in one data byte of data portions 452*n*−1 through 452*n* according to one specific scheme. For this purpose, any scheme is possible, not only the specifically depicted example of FIG. 3.

In contrast, data portion 452*n* has fewer than 8 bytes. However, bits of an error correction code are also distributed in data portion 452*n*.

In this case, relations between the number of data bits D and error correction bits E result for the shorter data portions such as data portion 452*n*, in which the combination of the number of data bits D and the number of error correction bits E are less easily mapped in hardware and is somewhat less efficient as a result. However, this is almost of no significance at all in the case of long frames 45 including, for example, 64 or 4 kBytes or 4096 bytes or longer, since only a shorter data portion including fewer than 8 bytes, if at all, is required for this, for example, at the end of the message.

Thus, in the case of data phase 452, usually one ECC byte including the error correction code is inserted for each 8 data bytes. Since the number of data bytes in the example of FIG. 3 in data phase 452 may not be divided by 8 without a remainder, an error correction code including fewer than 8 bits is distributed in shorter remainder portion 452*n*. In the example of FIG. 3, 3 bits 46 of the error correction code are distributed.

Thus, a method is carried out in user stations 10, 20, 30, in which messages 5 to be transmitted serially are transmitted together with error correction codes. The error correction coding of user stations 10, 20, 30 allows individual errors to be corrected, for example. Double errors may also be identified. Thus, in the case of individual errors, the error correction coding of user stations 10, 20, 30 avoids the repetition of the transmission of the initially erroneously received message 5 and the associated delay of the data of message 5 and the waste of the load on bus line 3.

Figure 4:
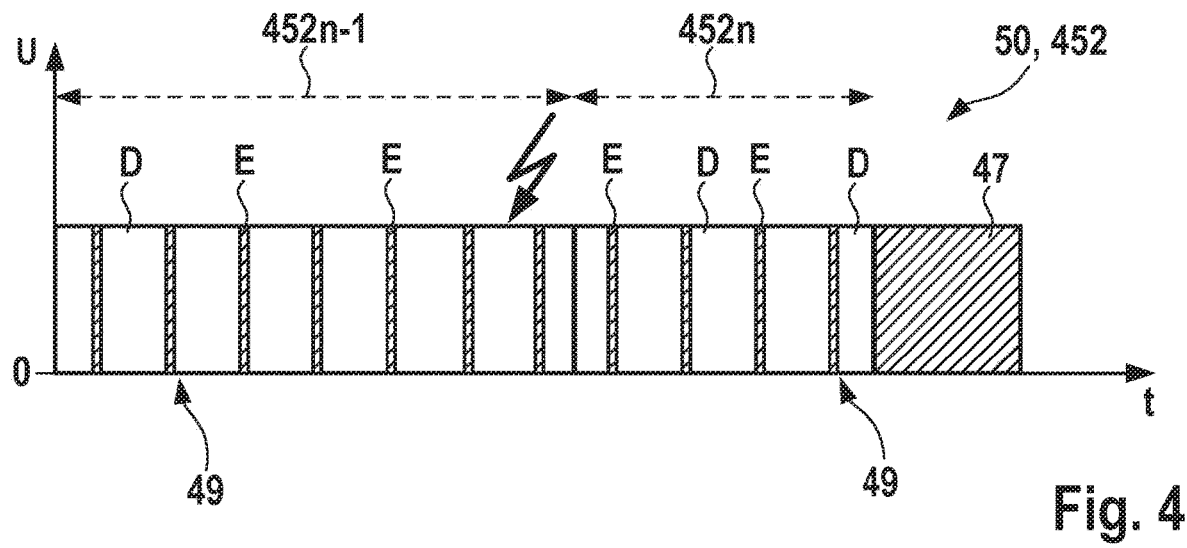
FIG. 4 schematically shows representation of one part of a message for a specific example of an insertion of error correction bits in a data phase of a message in a user station of a communication network according to one second exemplary embodiment of the present invention.

In contrast thereto, FIG. 4 shows with respect to one second exemplary embodiment a further specific distribution of error correction bits E in data portions 4521 through 452*n* in a message 50. Here, too, only two data portions are shown for the sake of simplicity, namely, the two data portions 452*n*−1 and 452*n* at the end of data phase 452.

An error, which is illustrated in the form of a black jagged block arrow, has also occurred in data portion 452*n*−1 in the example of FIG. 4. The error may be an individual error or a double error or an arbitrary other error.

According to FIG. 4, 4 data bits D are initially situated in data portion 452n–1, followed by an error correction bit E, then seven times 8 data bits D, followed by one error correction bit E each, and finally 4 data bits, i.e., DDDD E DDDDDDDD E DDDDDDDD E DDDDDDDD E DDDDDDDD E DDDDDDDD E DDDDDDDD E DDDDDDDD E DDDD or in a different notation

4D-E-8D-E-8D-E-8D-E-8D-E-8D-E-8D-E-8D-E-4D,

Error correction bits E are inserted here as double bits, for example, "10" for a '1' bit and "01" for a '0' bit. In this way, no more than 10 identical bits may occur in succession, as a result of which a minimum of synchronization edges 49 is ensured. Not all synchronization edges 49 are identified in FIG. 4.

If in the worst case a number of 8 data bits D having a value "00000000" is inserted between an error correction bit E="10" and an error correction bit E="01" for one of data portions 4521 through 452n, then 10 identical bits occur in succession. Such a case represents the largest spacing for synchronization edges 49.

This type of design and distribution of error correction bits E is applicable as well for data portions including fewer than 8 bytes, as shown for data portion 452n in FIG. 4.

Thus, two additional bits E per byte of payload data E are invariably added here. However, the added error correction bits E provide the ECC function, which provides a significant advantage over the related art.

In other words, in addition to the correction option with the aid of error correction bits E, the above-described method also forms synchronization edges 49 at which a receiver is temporally synchronizable with the transmitter. Synchronization edges 49 are, for example, edges from the recessive to the dominant bus level, a recessive bus level capable of being assigned logic '1' and a dominant bus level capable of being assigned logic '0'. The number of synchronization edges 49 may also be increased by coding the ECC bits as double bits, for example, "10" for '1' and "01" for '0'.

Thus, with the error correction code, an error correction coding (ECC) is implemented, and a sufficient number of synchronization edges 49 are provided so that there are no phase shifts between transmitter and receiver. Errors in the transmission of messages 5 are also avoided as a result. The synchronization with the aid of the at least one synchronization edge 49 may be carried out as hard synchronization or resynchronization. The resynchronization takes place as above-described.

The hard synchronization takes place, for example, in classic CAN frames only once at the beginning of the frame or of message 50. In the present CAN FD, a hard synchronization takes place before a change from the slow to the faster bit rate in the CAN FD message, namely for example, at the edge from the recessive FDF bit of the CAN FD message to the following dominant reserved bit of the CAN FD message. The further synchronization may then take place as hard synchronization or resynchronization with the aid of the at least one synchronization edge 49 in data portions 4521 through 452n of data phase 452.

Data portions 4521 through 452n also in the example of FIG. 4 may not only have fewer but also more than 8 data bytes. In this case, it should be noted that the longer the individual data portion 4521 through 452n becomes, the fewer error correction bits E there are to be distributed in data portions 4521 through 452n which guarantee synchronization edges 49. Moreover, the effort in generating and checking error correction bits E and the probability of a double error occurring increase with more than 8 data bytes per data portion 4521 through 452n.

Otherwise, the same applies as described above in conjunction with the first exemplary embodiment.

According to one modification of the above-described exemplary embodiments and their variants, it is possible for the above-described method to add a specific check sum 47 (CRC=cyclic redundancy check) at the end of message 5, 50, etc. or of the frame. This check sum 47 is applied only to the potentially corrected data bits in order to identify multiple errors in one of data portions 4521 through 4525.

According to one further modification of the above-described exemplary embodiments, it is possible for the above-described methods to insert error correction bits E as individual bits and, at the same time, provide a sufficient number of synchronization edges 49. The advantage of this is that only one error correction bit E per 8 data bits D need be inserted, which increases the net data rate compared to double bits as error correction bits E.

It is, of course, possible for the error correction code to include a combination of individual bits and double bits, at least one individual bit or at least one double bit being able to be present.

According to a still further modification of the above-described embodiments, it is possible for the above-described methods to arrange error correction bits E between data portions 4521 through 4525 in such a way that a sufficiently maximum spacing between synchronization edges 49 is ensured without stuff bits being inserted into the data stream after five identical bits as a bit inverse thereto, or without start bits and stop bits having to be inserted. In this case, the respective communication control unit 11, 21, 31 is designed to insert error correction bit E of the error correction code as at least one synchronization edge 49 in such a way that the spacing of synchronization edges 49 does not exceed a predefined upper limit.

In this case, it is also possible to save the stuff bits, which are inserted necessarily as an inverse bit in the case of a predetermined number of bits having the same level, if the error correction code or the coding for the generation of the error correction bits E guarantees that a maximum of 10 identical bits follow in succession. Such an error correction code results in a clock tolerance, which corresponds to a CAN frame 45 having a stuff length of 10.

This allows the additional effort for the error correction bit E to be compensated for by omitting the stuff bits or start and stop bits. An improved utilization of the available bus capacity and a higher bit rate in communication network 1 may be achieved overall with the above-described exemplary embodiments and their embodiment variants or modifications by reducing the errors during the transmission.

All above-described embodiments of communication network 1, of user stations 10, 20, 30 and of the method carried out by the latter may be used individually or in all possible combinations. All features of the above-described exemplary embodiments and/or their embodiment variants and/or their modifications may, in particular, be arbitrarily combined. In addition or alternatively, the following modifications, in particular, are possible.

Above-described communication network 1 according to the exemplary embodiments is described with reference to a bus system based on the CAN protocol. Communication network 1 according to the exemplary embodiments may, however, also be another type of serial communication network. It is advantageous, but not a necessary precondition, that in communication network 1 an exclusive collision-free access of a user station 10, 20, 30 to a shared channel is ensured at least for particular time spans.

The number and arrangement of user stations 10, 20, 30 in communication network 1 of the exemplary embodiments is arbitrary. User station 10, in particular, may be omitted in communication network 1. It is possible for one or multiple of user stations 10 or 20 or 30 to be present in bus system 1.

What is claimed is:

1. A user station for a serial communication network, comprising:
    a communication control unit configured to create a message, which is to be transmitted serially to at least one further user station of the communication network, wherein the communication control unit is configured to subdivide data of the message to be created into at least one data portion and to insert into each of the at least one data portion bits of an error correction code, which enables a correction of at least one error in the message.

2. The user station as recited in claim 1, wherein the error correction code is configured in such a way that a correction of an individual error in each of the at least one data portion is possible and a double error in the at least one data portion is able to be identified.

3. The user station as recited in claim 1, wherein the at least one error in the message is an individual error or a double error.

4. The user station as recited in claim 1, wherein the communication control unit is configured to add a check sum at an end of the message, which is applied to potentially corrected data bits.

5. The user station as recited in claim 1, wherein the communication control unit is configured to insert the bits of the error correction code as a synchronization edge in such a way that a spacing of synchronization edges, which are provided for a synchronization of the at least one further user station as receiver of the message with the user station as transmitter of the message, does not exceed a predefined upper limit.

6. The user station as recited in claim 5, wherein the synchronization edge is provided for a hard synchronization or for a resynchronization.

7. The user station as recited in claim 1, wherein the bits of the error correction code are individual bits or double bits, or the error correction code includes a combination of individual bits and double bits.

8. The user station as recited in claim 1, wherein the user station is configured for a communication network, in which an exclusive collision-free access of a user station to a bus line of the communication network is at least temporarily ensured.

9. The user station as recited in claim 1, wherein the message is a CAN message or a CAN FD message.

10. A communication network, comprising:
    a parallel bus line; and
    at least two user stations, which are interconnected via the bus line in such a way that they are able to communicate with one another, wherein at least one of the user stations includes:
        a communication control unit configured to create a message, which is to be transmitted serially to at least one further user station of the communication network, wherein the communication control unit is configured to subdivide data of the message to be created into at least one data portion and to insert into each of the at least one data portion bits of an error correction code, which enables a correction of at least one error in the message.

11. A method for correcting individual errors in a message of a serial communication network, the method comprising the following steps:
    creating, using a communication control unit of a user station, a message, which is to be transmitted serially to at least one further user station of the communication network; and
    subdividing, by the communication control unit, data of the message to be created into at least one data portion and inserting, in each of the at least one data portion, bits of an error correction code, which enables a correction of at least one error in the message.

* * * * *